(12) United States Patent
Darabian

(10) Patent No.: US 10,561,931 B2
(45) Date of Patent: Feb. 18, 2020

(54) METHOD AND APPARATUS FOR PROVIDING A COMPUTER IMPLEMENTED GAME

(71) Applicant: KING.COM LIMITED, St. Julians (MT)

(72) Inventor: David Darabian, Stockholm (SE)

(73) Assignee: KING.COM LTD., St. Julians (MT)

( * ) Notice: Subject to any disclaimer, the term of this patent is extended or adjusted under 35 U.S.C. 154(b) by 40 days.

(21) Appl. No.: 15/881,877

(22) Filed: Jan. 29, 2018

(65) Prior Publication Data

US 2019/0232155 A1    Aug. 1, 2019

(51) Int. Cl.
*A63F 9/06* (2006.01)
*A63F 13/77* (2014.01)
*A63F 13/20* (2014.01)
*A63F 13/52* (2014.01)

(52) U.S. Cl.
CPC ............ *A63F 9/0612* (2013.01); *A63F 13/77* (2014.09); *A63F 13/20* (2014.09); *A63F 13/52* (2014.09)

(58) Field of Classification Search
CPC ........ A63F 9/0612; A63F 13/77; A63F 13/20; A63F 13/52
See application file for complete search history.

*Primary Examiner* — Kevin Y Kim
(74) *Attorney, Agent, or Firm* — Saul Ewing Arnstein & Lehr LLP

(57) ABSTRACT

A computer device has a display which display game elements. A first type of game elements is associated with a matching characteristics of an ordered set of matching characteristics. At least one processor is configured to determine that at least three game elements have at least one common matching characteristic to satisfy a match condition and at least one of said game elements satisfying said match condition is of the first type. The first type of game elements in the match are removed if a current matching characteristic is a last matching characteristic of the respective ordered set or changed a next characteristic of the set.

25 Claims, 10 Drawing Sheets

METHOD AND APPARATUS FOR PROVIDING A COMPUTER IMPLEMENTED GAME

FIELD OF THE INVENTION

Embodiments of this application relate to a user device for use in playing a computer implemented game.

Some embodiments may relate to engaging users or players in a computer game executable in an online environment.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place of two adjacent game elements on the game board so that one or both of them create a chain of at least three adjacent game elements of the same type. Those matched game elements will then disappear. The game board is then repopulated with game objects.

One such known match three-type game is known by the trade name Candy Crush Saga. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking a group of adjacent game elements.

A technical challenge exists when introducing complexity into such match games. A technical challenge may arise for example when there is limited display resource available and/or in the providing of effective user engagement, such as described previously.

This patent specification describes not only various ideas and functions, but also their creative expression. A portion of the disclosure of this patent document therefore contains material to which a claim for copyright is made and notice is hereby given: Copyright King.com Limited 2018 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device comprising: a display configured to display game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics; a user interface configured to detect user input when a user engages with a game element in a move; and at least one processor configured to determine that at least three game elements have at least one common matching characteristic to satisfy a match condition and at least one of said game elements satisfying said match condition is of the first type, wherein the at least one processor is configured to determine for the or each of the game elements of the first type satisfying the match condition if a current matching characteristic is a last matching characteristic of the respective ordered set and if so to remove the respective game element of the first type from the game board and if not change at least one matching characteristic of the respective game element of the first type to a next characteristic of the set of matching characteristics.

The match condition may occur in response to the detected user input.

In some embodiments, the match condition may occur in response to movement of game elements due to a previous match condition.

The display may be configured to display the or each game element of the first type with information associated with a current matching characteristic of the respective ordered set.

The display may be configured to display the or each game element of the first type with a current matching characteristic of the respective ordered set.

The display may be configured to display the or each game element of the first type in a same position before and after the match condition is satisfied.

When at least one of game elements satisfying the match condition is of the second type, the at least one processor may be configured to remove the or each game element of the second type satisfying the match condition from the game board.

When at least one of the game elements satisfying the match condition is of the second type, the at least one processor may be configured to remove the or each game element of the second type satisfying the match condition from the game board and to generate replacement game elements.

The at least one processor may be configured, for at least one subsequent match of a respective game element of the first type, to cause the at least one characteristic to change to a next at least one characteristic of the set.

The ordered set of matching characteristics associated with at least one of the first type of game elements may have n matching characteristics, where n is an integer greater than or equal to 2, and the at least one processor may be configured when the first type of game elements has been associated in turn with n of the matching characteristics, to cause the respective game element of the first type to be removed from the game board as a result of a subsequent match.

A plurality of game elements of the first type may be provided, at least two of the game elements of the first type being associated with a same ordered set.

A plurality of game elements of the first type may be provided, at least two of the first game elements of the first type being associated with a different ordered set The game elements of the first type may be displayed in a visually distinct manner from the game elements of the second type.

The matching characteristic may comprise one or more of a colour characteristic; a shape characteristic; and an object characteristic.

At least one game element of the first type may be displayed with information indicating a number of matching characteristics in the ordered set of matching characteristics.

At least one game element of the first type may be displayed with information indicating a remaining number of matching characteristics in the ordered set of matching characteristics.

At least one game element of the first type may be displayed with information indicating a number of matching characteristics in the ordered set of matching characteristics which have been used.

The at least one processor may be configured to determine a triggering of a third type of game element, the third type of game element, when triggered, causing at least one respective game element of the first type to change to a next characteristic of the set.

The at least one processor may be configured to determine a triggering of a second type of game element, the second type of game element, when triggered, causing at least one respective game element of the first type to change to a next matching characteristic of the ordered set.

The at least one processor may be configured to provide a reward when said first game element has had each of said characteristics of said ordered set.

The reward may comprise a game element of the second type. The game element of the second type may be of the type which when triggered provides a special effect. The game element of the second type may not be of the type which can be triggered.

According to another aspect, there is provided a computer device having: a display configured to display game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics; a user interface configured to detect user input when a user engages with a game element in a move; and at least one processor configured to receive the detected user input and in response thereto determine that at least three game elements have at least one common matching characteristic to satisfy a match condition, wherein the at least one processor is configured to determine for the or each of the game elements of the first type satisfying the match condition if a current matching characteristic is a last matching characteristic of the respective ordered set and if so to remove the respective game element of the first type from the game board and if not change at least one matching characteristic of the respective game element of the first type to a next characteristic of the set of matching characteristics.

According to another aspect, there is provided a computer implemented method comprising: a displaying, by a display, game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics; detecting, via a user interface, user input when a user engages with a game element in a move; determining by at least one processor that at least three game elements have at least one common matching characteristic to satisfy a match condition; and determining by the at least one processor for the or each of the game elements of the first type satisfying the match condition if a current matching characteristic is a last matching characteristic of the respective ordered set and if so removing the respective game element of the first type from the game board and if not changing at least one matching characteristic of the respective game element of the first type to a next characteristic of the set of matching characteristics.

The method may comprise displaying by the display the or each game element of the first type with information associated with a current matching characteristic of the respective ordered set.

The method may comprise displaying by the display the or each game element of the first type with a current matching characteristic of the respective ordered set.

The method may comprise displaying by the display the or each game element of the first type in a same position before and after the match condition is satisfied.

When at least one of game elements satisfying the match condition is of the second type, the method may comprise removing the or each game element of the second type satisfying the match condition from the game board.

When at least one of the game elements satisfying the match condition is of the second type, the method may comprise removing the or each game element of the second type satisfying the match condition from the game board and generating replacement game elements.

The method may comprise, for at least one subsequent match of a respective game element of the first type, causing the at least one characteristic to change to a next at least one characteristic of the set.

The ordered set of matching characteristics associated with at least one of the first type of game elements may have n matching characteristics, where n is an integer greater than or equal to 2, and the method may comprise when the first type of game elements has been associated in turn with n of the matching characteristics, causing the respective game element of the first type to be removed from the game board as a result of a subsequent match.

A plurality of game elements of the first type may be provided, at least two of the game elements of the first type being associated with a same ordered set.

A plurality of game elements of the first type may be provided, at least two of the first game elements of the first type being associated with a different ordered set The method may comprise displaying game elements of the first type in a visually distinct manner from the game elements of the second type.

The matching characteristic may comprise one or more of a colour characteristic; a shape characteristic; and an object characteristic.

At least one game element of the first type may be displayed with information indicating a number of matching characteristics in the ordered set of matching characteristics.

At least one game element of the first type may be displayed with information indicating a remaining number of matching characteristics in the ordered set of matching characteristics.

At least one game element of the first type may be displayed with information indicating a number of matching characteristics in the ordered set of matching characteristics which have been used.

The method may comprise determining a triggering of a second type of game element, the second type of game element, when triggered, causing at least one respective game element of the first type to change to a next characteristic of the set.

According to some aspects, there is provided a program product comprising a computer-readable storage device including a computer-readable program for providing a computer-implemented game, wherein the computer-readable program when executed on a computer causes the computer to perform any one or more of the method steps described previously.

According to another aspect, there is provided a computer readable non-transitory storage medium carrying one or more computer executable instructions which when run on at least one processor cause: displaying of game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics; detecting user input when a user engages with a game element in a move; determining that at least three game elements have at least one common matching characteristic to satisfy a match condition; and determining for the or each of the game elements of the first type satisfying the match condition if a current matching characteristic is a last matching characteristic of the respective ordered set and if so removing the respective game element of the first type from the game board and if not changing at least one matching characteristic of the respective game element of the first type to a next characteristic of the set of matching characteristics.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which.

DESCRIPTION OF PREFERRED EMBODIMENTS

The terms user and player are used interchangeably throughout this document and no specific meaning is intended using one or the other unless the context suggests otherwise. In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations.

Figure 4:
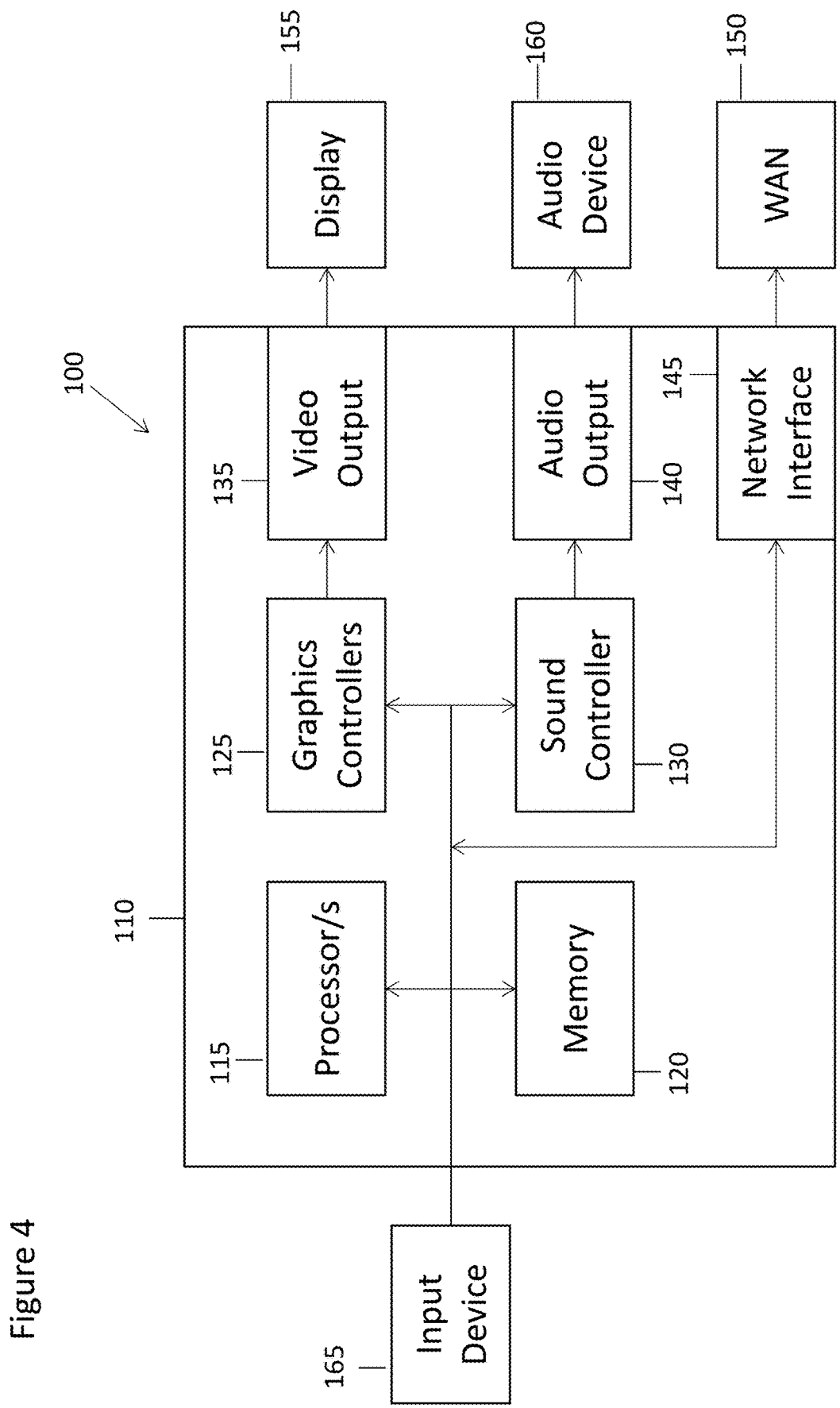
FIG. 4 shows an example user device in which some embodiments may be provided.

A schematic view of a user device 100 according to an embodiment is shown in FIG. 4. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller.

It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
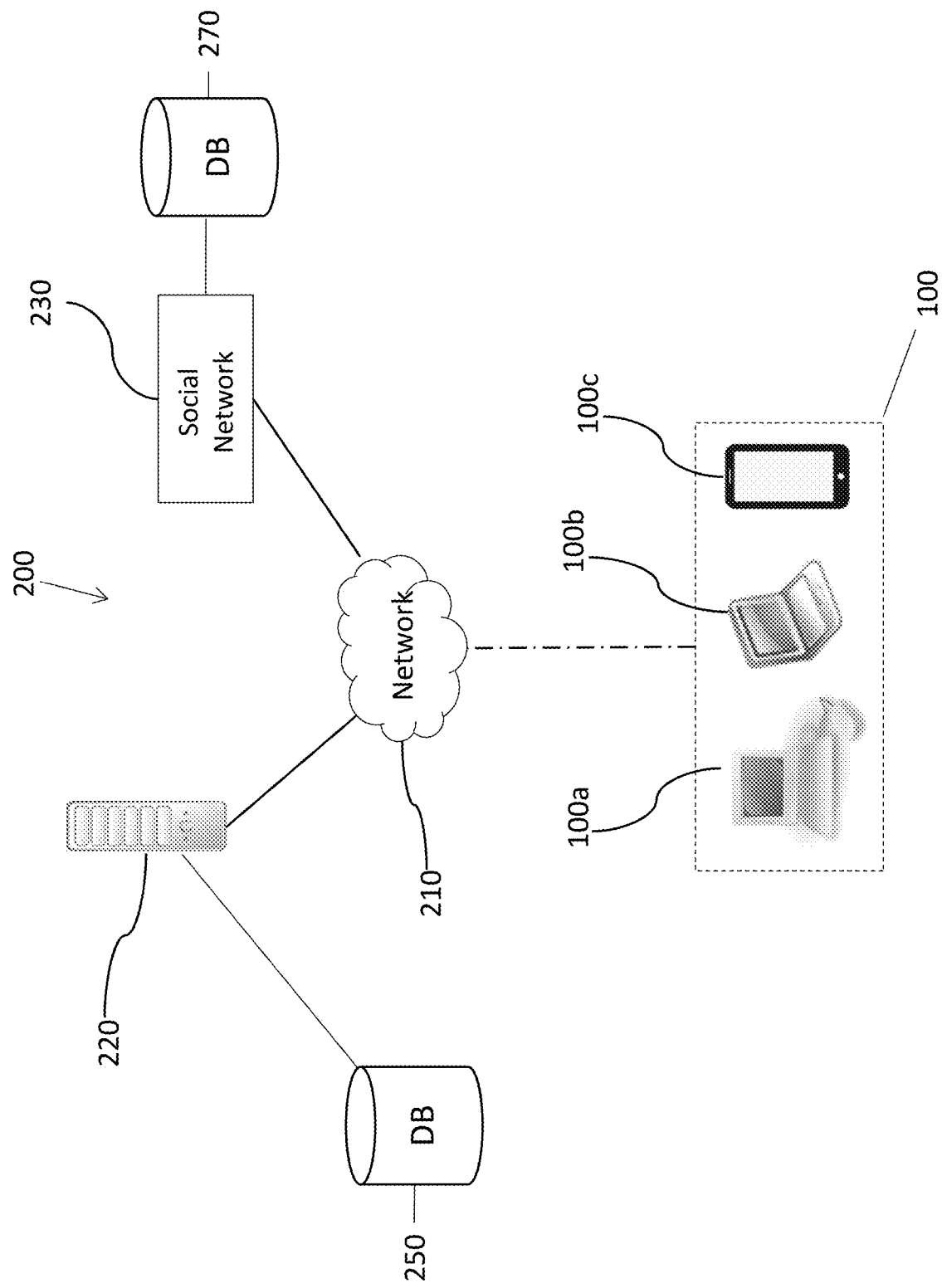
FIG. 3 shows an example system in which some embodiments may be provided.

FIG. 3 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

Figure 6:
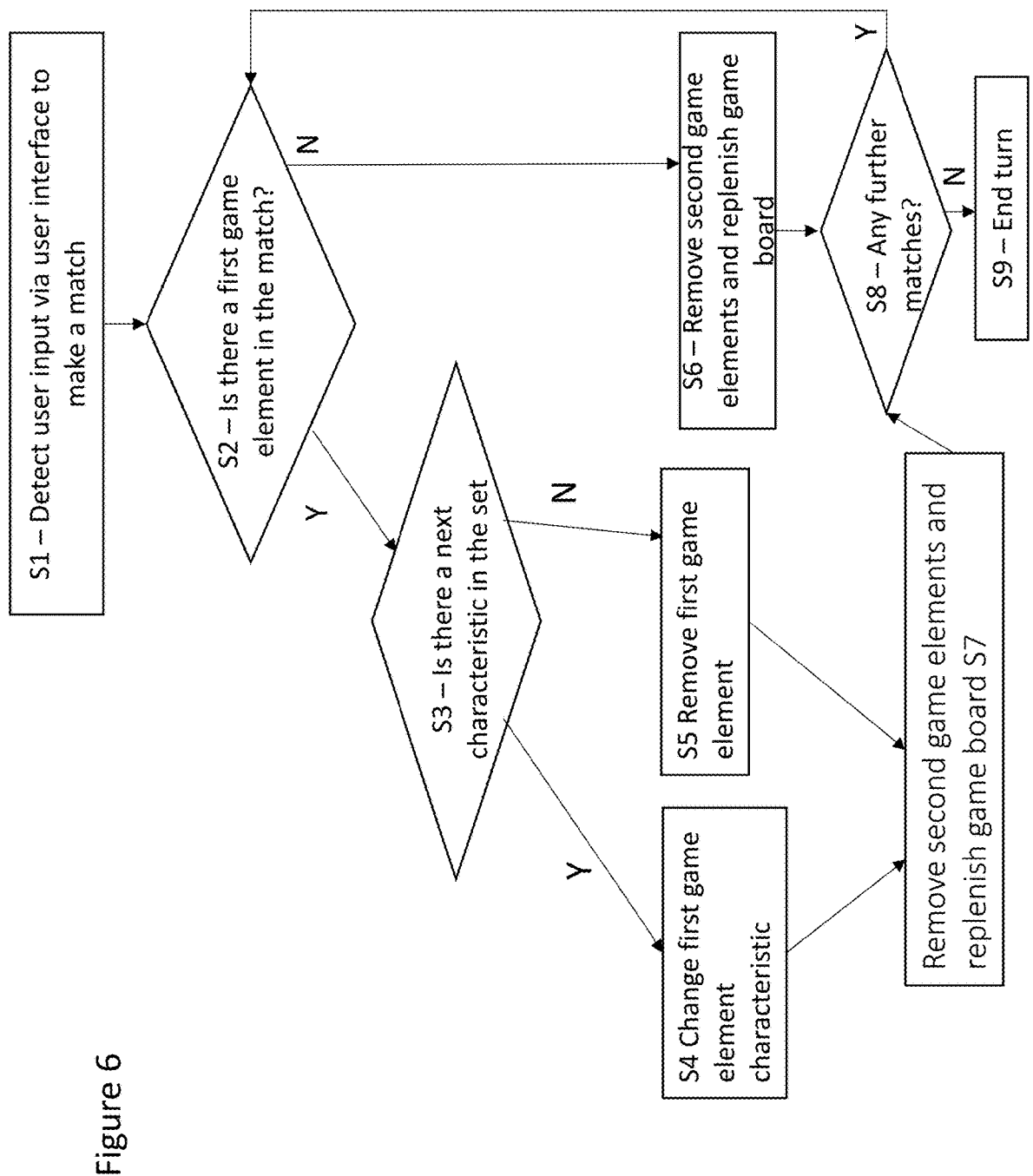
FIG. 6 is a flow chart showing steps performed by a user device.

The server 220 may communicate via, for instance, the internet 210 to one or more client or user devices 100, shown in FIG. 6 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1:
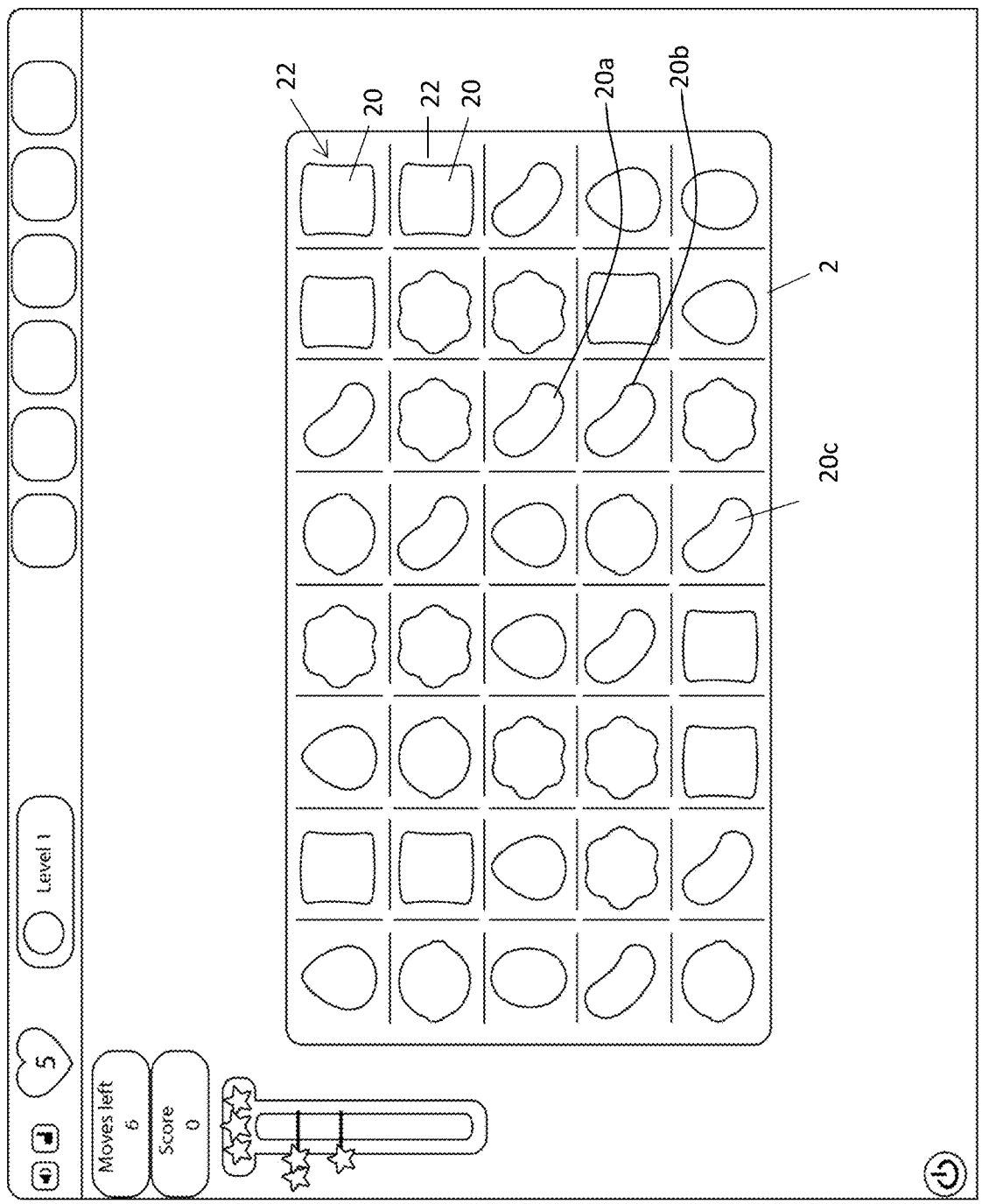
FIG. 1 is a schematic diagram of a game board of a match three game illustrating a basic example of a match three game.

FIG. 1 shows a display of a known version of a match 3 switcher game called Candy Crush Saga™. FIG. 1 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 2:
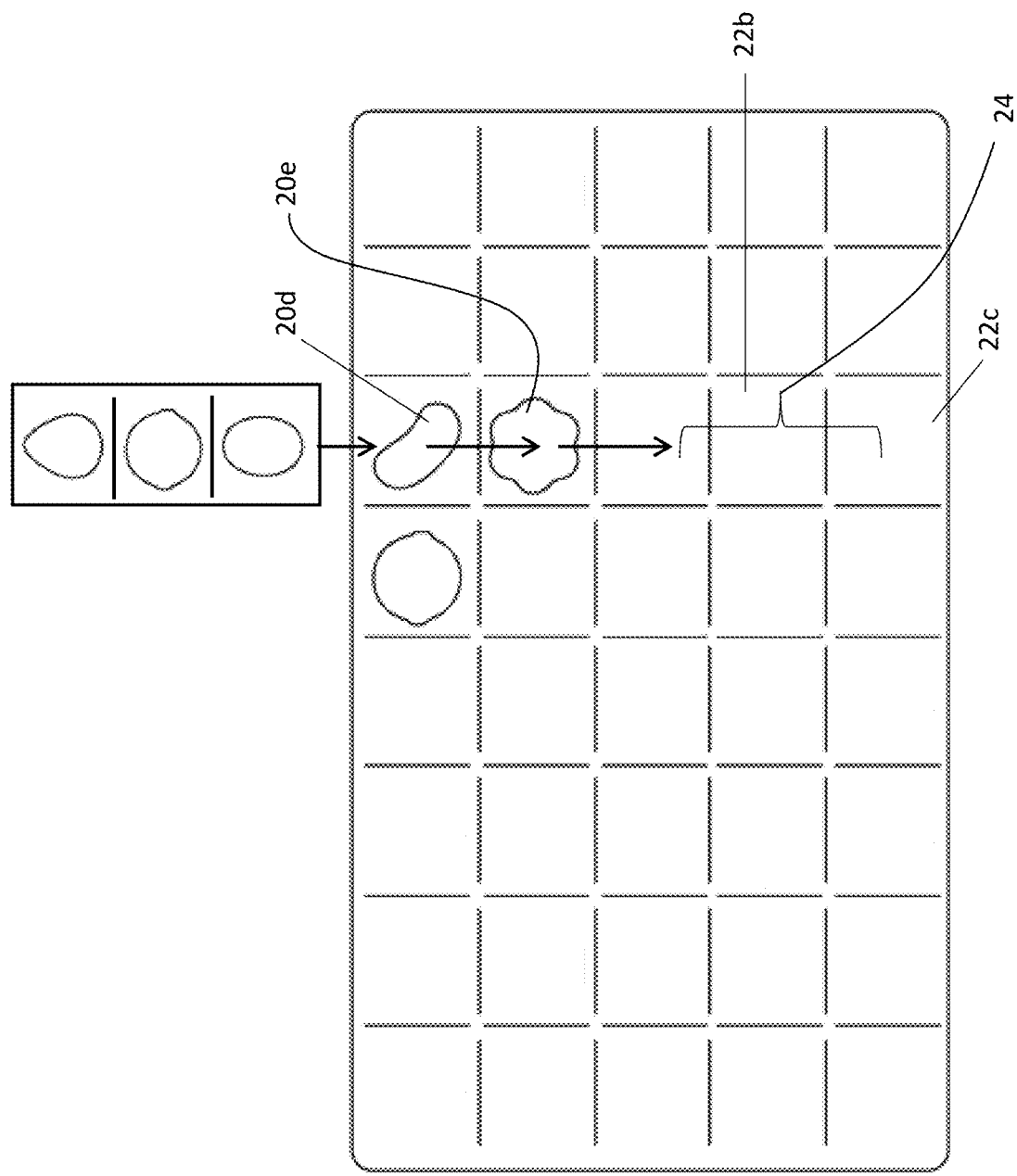
FIG. 2 is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20c is moved one place to the right to form a three-line match with game elements 20a and 20b. Turning now to FIG. 2, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

Some embodiments may use so-called physics to control movement of game elements when replenishing a game board. For example, some embodiments may use the game physics used in Candy Crush Saga. In this game, game elements drop down from above the game board at a set speeds and from the top of the game board. In an alternative version of this game detailed in U.S. Ser. No. 14/316,274 and launched under the name Candy Crush Soda, the physics can vary so that the speed and direction of replacement game elements can alter. It should be appreciated that the game physics described are by way of example and in other embodiments any suitable game physics may be used. In some embodiments, the replenishment of a game board may be controlled without the use of game physics.

In the following, a game board is made up of game positions or tiles each of which is covered by a respective game element.

In some embodiments, one or more of the game elements of a first type is associated with an ordered set of matching characteristics starting with a first matching characteristic. These game elements of the first type will be referred to first game elements in the following. When a match is made with one or more these first game elements, the respective first game element will have the next matching characteristic of that set.

The set of characteristics comprises at least two matching characteristics. At least two of the matching characteristics will be different. In some embodiments, all the characteristics will be different. In some embodiments, the set of characteristics may have more than one of the same matching characteristic.

One example of a set of matching characteristics may be a blue matching characteristic and a yellow matching characteristic. The minimum number of matching characteristics in a respective set is two. In some embodiments, the minimum number of matching characteristics in a respective set which are different may be two.

Another example of a set of matching characteristics is a blue matching characteristic, a yellow matching characteristic, and a green matching characteristic. In this example, the set comprises three different matching characteristics. It should be appreciated that different number of characteristics may be provided alternatively or additionally, for example three or more.

Another example of a set may be a blue matching characteristic, a yellow matching characteristic, a blue matching characteristic. In this example, the set comprises two different matching characteristics and three different matching characteristics in the set.

In the above examples, colour is used as an illustrative example of a type of matching characteristic. In other embodiments, the type of characteristic may alternatively or additionally comprise shape, wording, numbering, object, tag, visual effect and/or the like.

In some embodiments, a combination of different types of characteristics may be used as a matching characteristic. For example, the shape and colour characteristics may be used. For example the matching characteristic may be red and square.

In some embodiments, the set of matching characteristics may comprise a plurality of different types of characteristics. For example the set of matching characteristics may comprise red, green, square and triangle. In this illustrative example, some characteristics are of the colour type and others are of the shape type. Of course in other embodiments, the different types of matching characteristic may be any suitable type of matching characteristics.

In one example embodiment, a first game element may have a particular shape and a colour associated with that particular shape. The matching characteristic may be shape and colour or the matching characteristic may be colour and the shape is used to help visually distinguish from game elements having a different colour as a matching characteristic.

It should be appreciated that a single set of characteristics may be used in the game. In some embodiments a plurality of different sets of matching characteristics may be provided. The number of characteristics in the different sets may be same or different. Different characteristics and/or different orders of characteristics and/or different types of characteristics may be provided in a set. The set or sets of characteristics which are used may be dependent on a level of a game.

In some embodiments, the first game element may be a so-called blocker. This means that the position of the first game element with respect to the game board is unchanged even if, for example a removable game element located below (if the direction of replenishment is from above) that blocker is removed. The removable game elements are game elements of a second type and will be referred to as second game elements. These second game elements will move in the game board if for example a game element below it (if the direction of replenishment is from above) is removed. It should be appreciated that one or more additional or alternative directions of replenishment may be used in different embodiments which will influence the movement of second game elements when game elements are removed from the game board.

Figure 5:
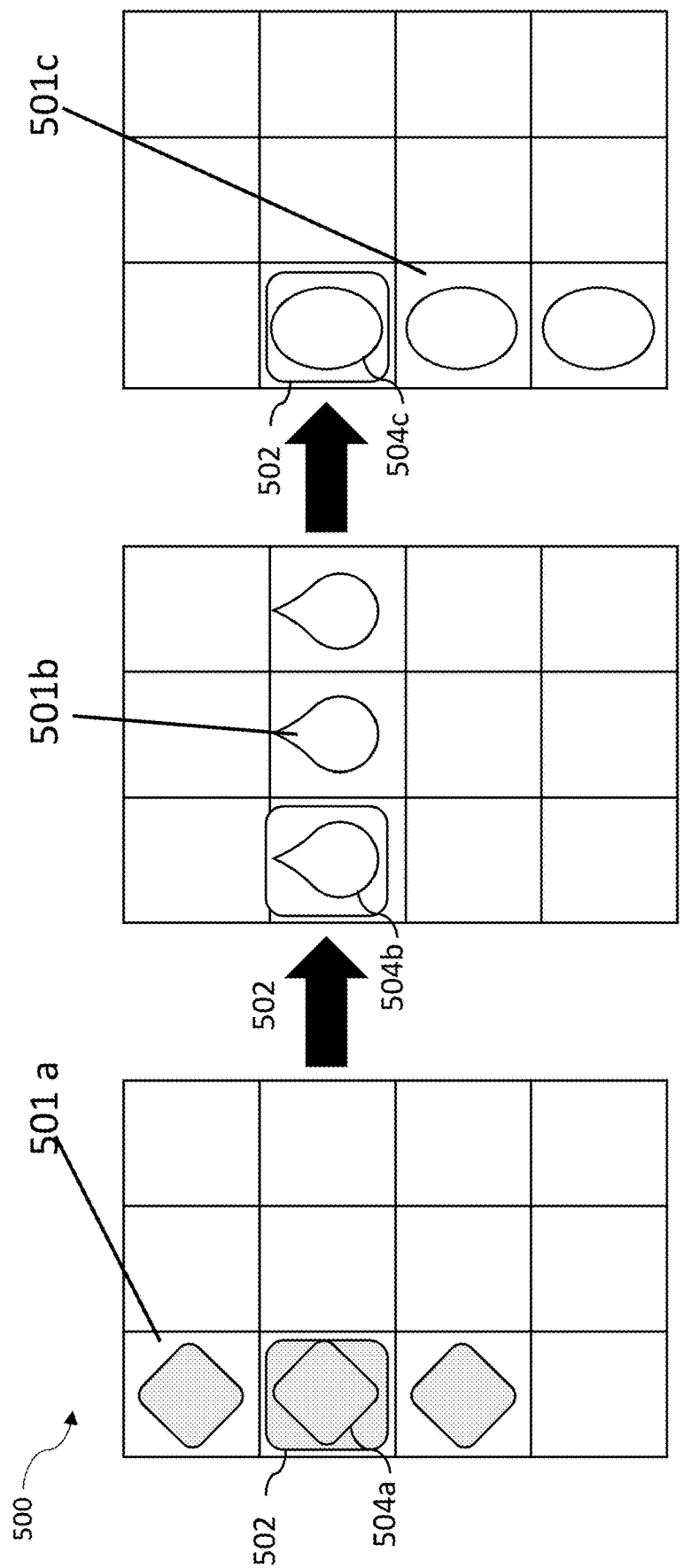
FIGS. 5A to 5C schematically show a game board with a first game element at different times.

FIGS. 5A, 5B, and 5C show an example of first game element 502 through a series of three consecutive matches. In each match the first game element 502 has a matching characteristic (for example colour and shape), which matches the characteristics of at least two adjacent game elements. These may be game elements of the first type and/or game elements of the second type.

In FIG. 5A a match-3 combination has been made in the left-most column of the game board 500. For clarity only the game elements involved in a match condition are shown FIGS. 5A to 5C but it should be appreciated that in practice, the game board will be filled at least partially with other game elements. Those other game elements may comprise game elements of the first and/or second type.

The first game element 502 is included within this match with two second game elements 501a, in the example shown in FIG. 5A. The matching characteristic in this example may for example be colour and shape. For example all three of the matching game elements are cyan in colour and diamond shaped. In response to the match, the second game elements are removed from the game board as normal.

Reference is now made to FIG. 5B. The first game element 502 remains fixed on the game board in the same location. The characteristic of the first game element 502 changes to the next characteristic of the set. In this particular example the characteristic of the first game element changes its colour and shape. For example, the first game element may now have a tear drop shape and be yellow. The game board is been refilled around the first game element 502. Refill occurs normally around the first game element.

Again, the first game element is involved in a match with two adjacent second game elements 501b sharing the same matching characteristic (same colour and shape). The matching second game elements are removed and the matching characteristic of the first game element changes to the next one of the set (e.g. orange and oval). Thus a match-3 combination in the case of FIG. 5B has been made horizontally in the second row of the game board 500.

FIG. 5C shows a third match-3 combination involving the same first game element 502. A match is made with two further game elements 501c of the second type with the same matching characteristic (orange and oval). The second game elements are removed as a result of the match.

In some embodiments, if there are no more characteristics in the set of characteristics remaining, then the first game element may be removed from the game board on making a match.

In some embodiments, the first game element may be visually distinguished from second game elements. For example, the first game element may appear to be under a translucent layer. It should be appreciated that any other suitable visual distinction may be used alternatively or additionally. For example, a particular background may be used and/or a tag and/or the like.

Reference is made to FIG. 6 which shows a first method according to an embodiment. The method may be performed by at least one processor in conjunction with at least one memory of the user device.

In step S1, user input via the user interface which will a match to be made. This may be responsive to the user interacting with the game board via the user interface (for example a touch screen on which a game board of game elements is displayed). For example, the user may interact with the user interface to swap the position of two game elements to make a match.

In step S2, the game elements which are in the match are analysed to determine if any of game elements in the game elements of the match is a first game element. It should be appreciated that there may be more than one first game element in the match. All the game elements in a match may be first game elements.

If so, then the next step is step S3. In step S3, it is determined if there is a next characteristic in the set of characteristics. This will be carried out for each of the first type of game element in the match. If so, the next step is step S4 for any first game element for which there is a next characteristic in the set of characteristics.

In step S4, the characteristic of the first game element(s) for which there is a next characteristic in the set of characteristics is changed to the next characteristic of the set of characteristics.

If there is no next characteristic in the set of matching characteristics for a given first game element, then step S3 is followed by step S5 for that given first game element. In step S5, the first game element(s) of the match, for which there is no next characteristic in the set of characteristics, is removed.

In some embodiments, steps S4 and S5 may both be performed after a match has been made. In those embodiments, the steps may be performed at generally the same time or in any order.

Steps S4 and S5 are both followed by step S7 where the second game elements are removed and the game board is replenished. In some embodiments, step S7 may be part of step S4 and/or step S5.

If it is determined in step S2 that there are no first game elements in the match, then the next step is step S6 in which the second game elements of the match are removed and the game board is replenished.

Steps S6 and S7 are followed by step S8 in which it is determined if there are any further matches.

If there are, then the next step is step S2. If not, the next step is step S9 when the turn is ended.

Figures 7A, 7B, 7C:
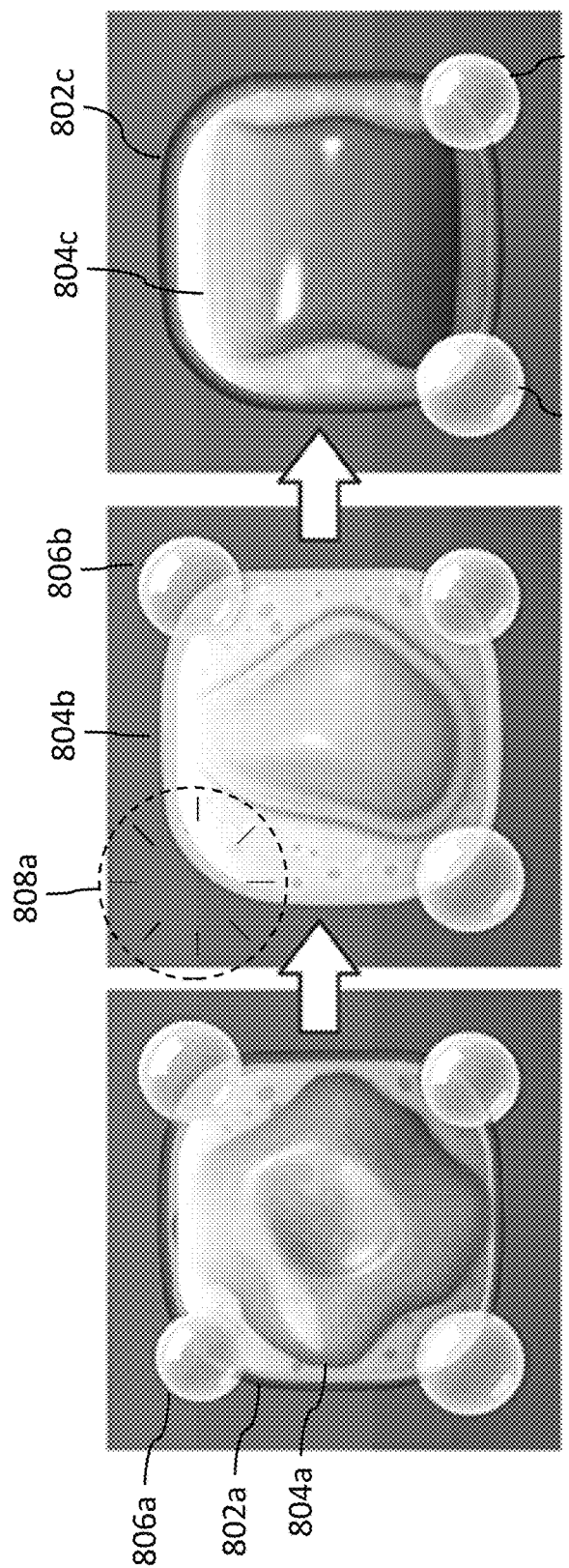
FIGS. 7A to 7C schematically show an example of a first game element having successive characteristics of an ordered set.

FIGS. 7A, 7B, and 7C show an indicator for providing an indication of how many characteristics there are remaining in the set for the first game element or number of further matches required. The indicator may take any suitable form. In the example shown a number of bubbles are used to indicate the number of remaining characteristics. Alternatively, a single indicator presenting a number may be attached to or made visible on the first game element.

In FIGS. 7A-7C the bubbles indicate how many characteristics remain in the set. Alternatively the bubbles may be used to indicate how many characteristics of the set have been used in previous game moves.

FIG. 7A shows the first game element 804*a* with a diamond shape. In this example, the first game element is provided with a translucent layer 802*a* which is used to distinguish the game element as being a first game element. On each corner of the first game element there is a bubble. Each bubble 806 corresponds to a remaining one of the characteristics in the set of characteristics.

Upon successfully involving the first game element in a match the top-left corner bubble 806*a* bursts, leaving the remaining three bubbles intact. This is shown in FIG. 7B. The first game element will change to the next characteristic. When the match is made the first game element may move to impact the corresponding bubble 806*a* to thereby "burst" the bubble. The bubble may emit particles 808*a* of a colour corresponding to the colour characteristic of the first game element. The first game element may be arranged to have the next one of the characteristics after or during the bursting of the bubble. FIG. 7B shows the first game element 804*b* now has a colour characteristic of yellow and an oval shape. The first game 804*b* now also has only three bubbles, indicating that there are three characteristics remaining in the set of characteristics.

Upon being involved in a match and removing a further layer, the top right-hand corner bubble 806*b* bursts, indicating that only two characteristics in the set of characteristics remain.

FIG. 7C shows the same first game element 804*c* as in FIGS. 7A and 7B. However, the first game element 804*c* now has a colour characteristic of green and is square. The first game element also only has two bubbles in the bottom left-hand corner 806*c* and the bottom right-hand corner 806*d*. The two remaining bubbles 806*c* and 806*d* indicate to the player that only two characteristics remain in the set of matching characteristics.

Figure 8:
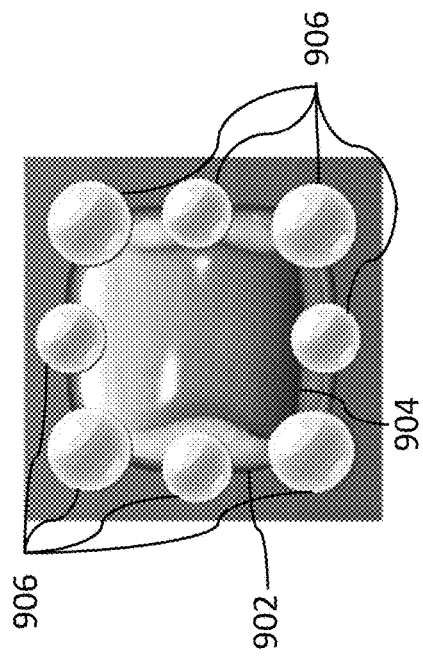
FIG. 8 schematically shows another example of a first game element.

FIG. 8 shows a first game element 902 with a maximum of eight bubbles 906 indicating that there are eight characteristics in the set of characteristics. The eight bubbles 906 are positioned such that one of the bubbles 906 is located at each corner and at the midpoint of each side of the first game element 902. After each match the matching characteristic of the first game element changes. This change in matching characteristic may occur before another move can be made.

In some embodiments, a matching characteristic of the first game element may be changed if the first game element is effected by a special game element. A special game element may have game element removing properties with respect to the second game elements such as a line blast, row blast, bomb or the like. The special game element may be triggered by a match which does not include the first game element but still effects the matching characteristic of that first game element.

When the first game element has had all the matching characteristics of the set of matching characteristics, the first game element may be removed. In some embodiments, on a match being made with the first game element having the last characteristic of the set, the first game element maybe converted to a second game element. In some embodiments, the second game element may be a special game element, for example as previously mentioned. Alternatively or additionally another game reward may be provided. That reward may be extra points, a special character, extra time, an item or any other suitable reward.

A sound effect may be used to indicate each change in characteristic of a first game element.

In some embodiments, the first game element is visualised such that each matching characteristic of the set is considered to be a layer. The aim may be remove all the layers, that is to progress to the end of the ordered set.

In some embodiments, the first game element may be visualised as an object with a set of parts which are to be completed or acquired or consumed or lost. In some embodiments, the object may be visualised as having a set of segments which are to be completed or consumed. Such an object may be represented as a "pie" to be completed or to be consumed. In some embodiments, each part or each segment may represent one of the set of matching characteristics. The segment or part which is active, that is which has the match characteristic which is active may be displayed in a visually distinct way from the other segments or parts. Segments or parts which represent characteristics which have been used may be represented in a visually distinct way from those which are yet to be used.

In some embodiments where n adjacent first elements are provided and they all have the same current matching characteristic, the n first elements may be removed from the game board. N may be any suitable number and in some embodiments may be 3 or more. In some embodiments, all of the n adjacent first game elements having the same characteristic may be a result of for example various matches made by the user while playing the game and/or by the triggering of one or more special game elements. The n adjacent first game elements may have different initial matching characteristics.

Figure 11:
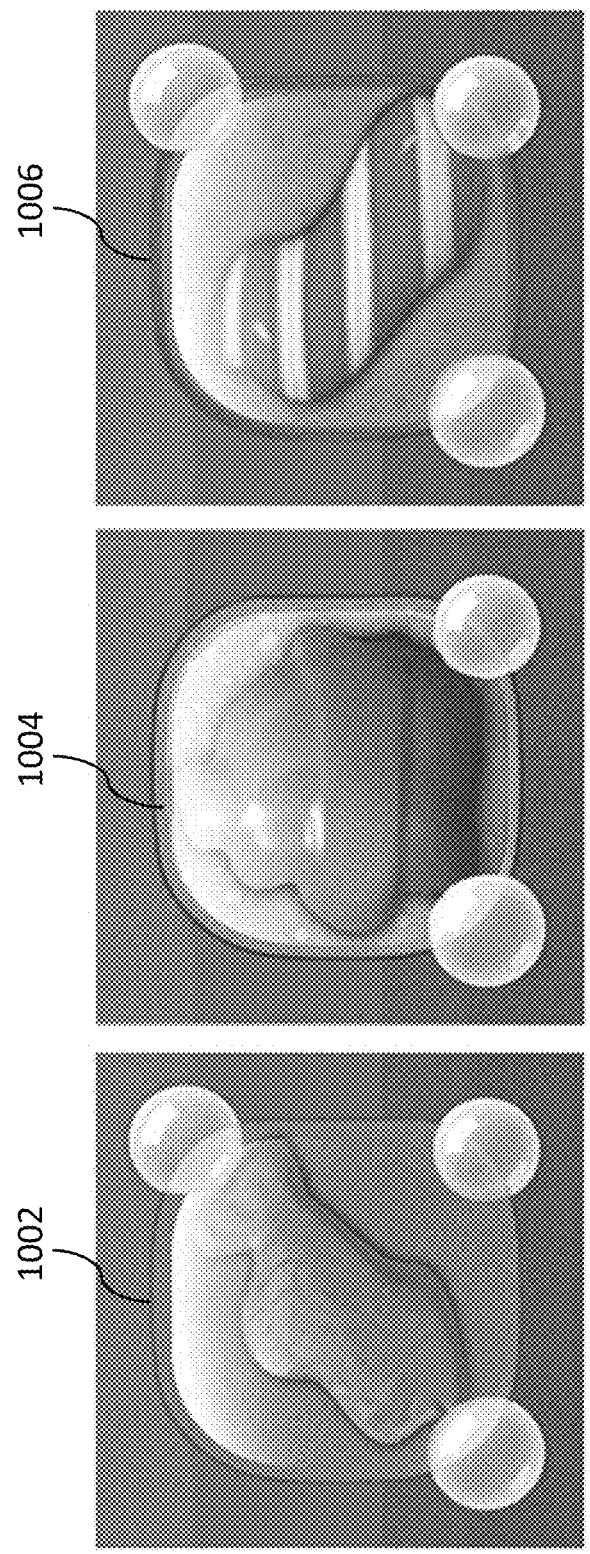
FIG. 11 schematically shows another example of a first game element.

Reference is made to FIG. 11 which shows an example embodiment where the first game element has a so called special effect such as previously described. The matching characteristics of the special game element changes as previously described. However, in some embodiments, the effect of the first game element in the form of a special game element is not triggered until the first game element has progressed through all the matching characteristics of the set of characteristic. In some embodiments, the special effect is triggered when the first game element achieves the final matching characteristic of the set. In some embodiments, the special effect is triggered when the first game element is in a match or triggered by another special game element after the final matching characteristic of the set has been achieved.

In some embodiments, the first game element may be replaced by a special game element or second game element once the first game element achieves the final matching characteristic of the set. In some embodiments, when the first game element achieves the final matching characteristic of the set, a special game element or second game element is provided elsewhere on the game board.

FIG. 11 shows a so called fish special game element which removes one or more other game elements when released, a soda bottle special game element which releases soda to have an effect of the game physics in a particular location on the game board and a line blaster special game element which removes games elements in a particular direction when released. It should be appreciated that the special game elements shown are by way of example only and other special game elements may alternatively or additionally be used as first game elements in some embodiments.

Figure 9:
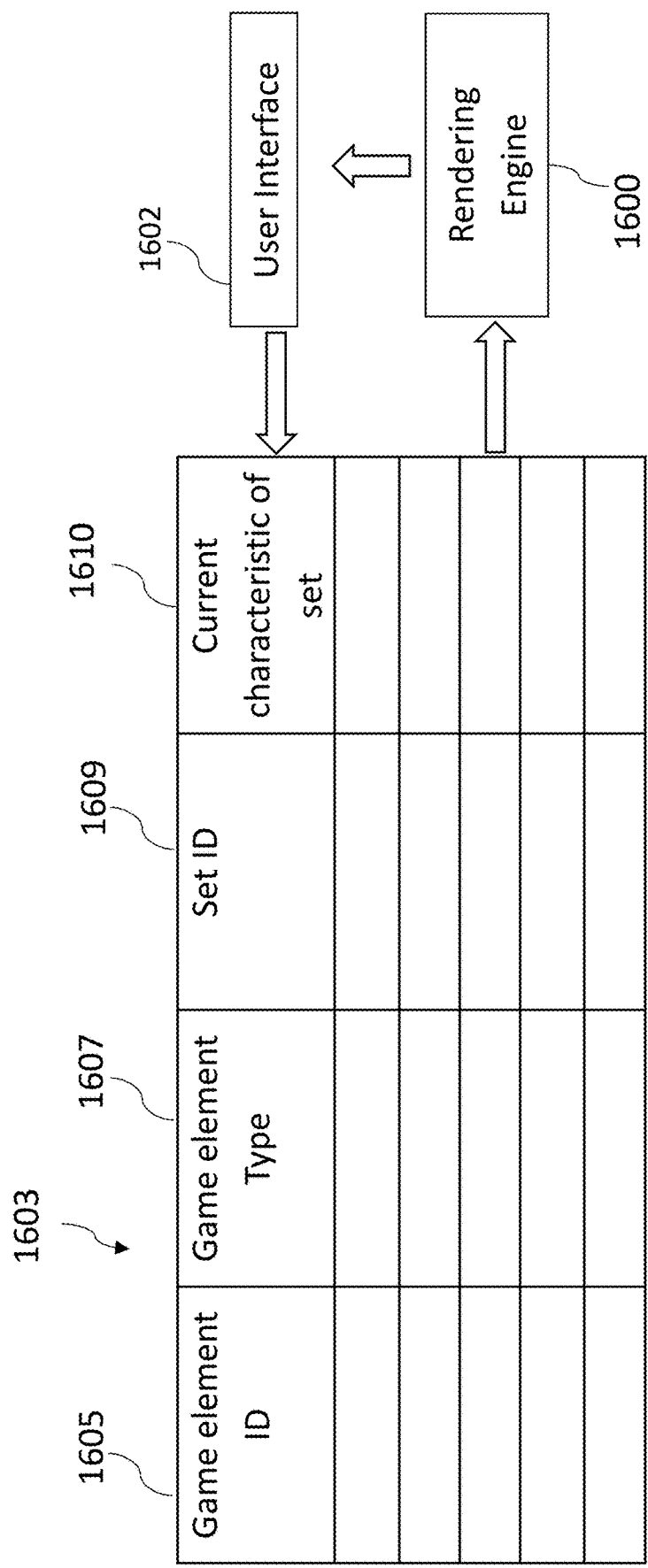
FIG. 9 schematically shows a data structure for managing game element data, showing the interrelation between the data structure and a rendering engine of a graphics controller.

FIG. 9 illustrates a data structure for managing the appearance of a first game element, and schematically illustrates the interrelation between the data structure 1603 and a rendering engine 1600 of the graphics controller 180. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game board displayed. Each game element has a game element ID 1605. The game element ID 1605 is used by the game engine. The game element ID may be allocated a particular position on a game board. The data structure may have information 1607 identifying the game element type 1607 (for example if the game element is a first game element, a second game element or a special game element. If the game element is a first game element, the game element may have a set ID 1609. This may be provided in those embodiments where a plurality of different sets of characteristics are provided. The set ID will identify which of the plurality of sets is associated with the first game element. The current characteristic field will indicate the current match characteristic for the first game element. This may take any suitable form. For example a bit may be provided for each characteristic with only the bit of the current characteristic being set. This data allows the rendering engine 1600 to generate a first game element with its current characteristic of the set.

After a move has been made or after there has been some change to the game board, the game engine will update this data. The current matching characteristic of the set is updated and the next characteristic of the set is now the current characteristic. The first game element will be rendered by the rendering engine and displayed with the updated characteristic of the set.

In some of the previously described embodiments, the first game element has been described as being a blocker. In other embodiments, the first game element may not be a blocker and thus may move in the same way as outlined in relation to the second type of game elements.

Figure 10:
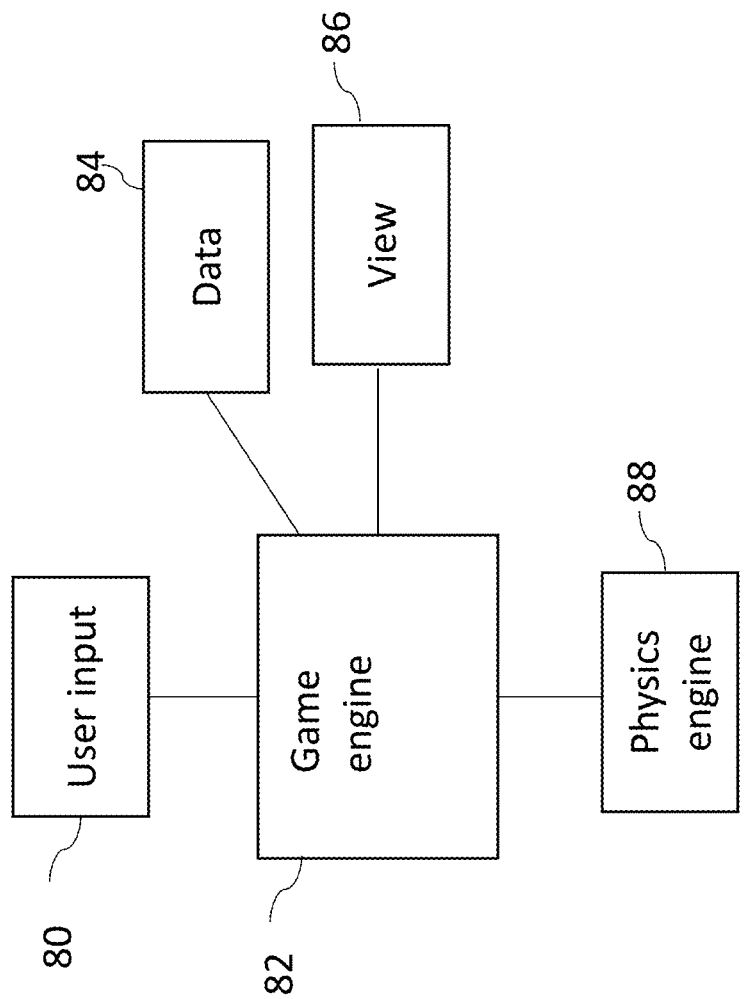
FIG. 10 is a schematic diagram showing the modules and functions associated with carrying out the operating of embodiments.

Reference is made to FIG. 10 which schematically shows the functional blocks of an embodiment, which may enable game play such as discussed previously. A user input block 80 is shown. This captures the user input and feeds the input to a game engine 82. In the context of the game of some embodiments, this user input may be which game elements are switched by a user. This user input can be via any suitable user interface, such as discussed earlier. One or more of the functional blocks of FIG. 10 may be performed by at least one processor.

The game engine 82 will process the information provided by the user input. The game engine 82 (for example a game model) will determine if a valid combination has been made.

Each game element has data associated therewith. The data 84 may be stored in any suitable memory location. In some embodiments, the data may be provided by the data structure described previously. In some embodiments, the data may be considered to be part of the game engine and in other embodiments may be considered to be outside the game engine. The data may provide information as to the properties of the game element such as described previously. The data may include the position data, that is, information representing the position of the game element in the displayed image.

In some embodiments, the game engine will check if the game elements satisfies the rule or rules for a valid match. The rule or rules which define whether or not a match condition has been satisfied. The match condition will be dependent on the game. In some embodiments, a match condition will be satisfied if the game elements are arranged to provide a sequence of at least three adjacent first objects sharing at least one same characteristic.

Thus, the game engine will be in control of the matching mechanism. The game engine will have access to data for game element including its position and will be able to determine if a match condition has been met.

It should be appreciated that in other embodiments, the game may use any type of match mechanic such as switching, sliding or linking. The game elements may be any suitable game element and in some embodiments may be letters. In that scenario a match will occur when the letters match a word. Preferably the word is at least three letters long.

A physics engine 808 is provided which is configured to control the movement of moving game elements on the display. The tiles are static is some embodiments.

The physics engine 808 may be part of the game engine 802.

A view function 806 uses of the data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device comprising:
a display configured to display game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics;
a user interface configured to detect user input when a user engages with a game element in a move; and
at least one processor configured to determine that at least three game elements have at least one common matching characteristic to satisfy a match condition and at least one of said game elements satisfying said match condition is of the first type, wherein the at least one processor is configured to determine for each game element of the first type satisfying the match condition if a current matching characteristic is a last matching characteristic of the respective ordered set and if so to remove the respective game element of the first type from the game board and if not change at least one matching characteristic of the respective game element of the first type to a next characteristic of the ordered set of matching characteristics.

2. The computer device as claimed in claim 1, wherein the display is configured to display each game element of the first type with information associated with a current matching characteristic of the respective ordered set.

3. The computer device as claimed in claim 1, wherein the display is configured to display each game element of the first type with a current matching characteristic of the respective ordered set.

4. The computer device as claimed in claim 1, wherein the display is configured to display each game element of the first type in a same position before and after the match condition is satisfied.

5. The computer device as claimed in claim 1, wherein when at least one of the at least three game elements satisfying the match condition is of the first type and at least one of the at least three game elements satisfying the match condition is of the second type, the at least one processor is configured to remove each game element of the second type satisfying the match condition from the game board.

6. The computer device according to claim 1, wherein the at least one processor is configured, for at least one subsequent match of a respective game element of the first type, to cause the at least one matching characteristic to change to a next at least one matching characteristic of the ordered set.

7. The computer device according to claim 1, wherein the ordered set of matching characteristics associated with at least one of the first type of game elements has n matching characteristics, where n is an integer greater than 2, and the at least one processor is configured when the first type of game elements has been associated in turn with n of the matching characteristics, to cause the respective game element of the first type to be removed from the game board as a result of a subsequent match.

8. The computer device as claimed in claim 1, wherein a plurality of game elements of the first type are provided, at least two of the first game elements of the first type being associated with respective different ordered sets.

9. The computer device as claimed in claim 1, wherein the game elements of the first type are displayed in a visually distinct manner from the game elements of the second type.

10. The computer device according to claim 1, wherein the matching characteristic comprises at least one of a colour characteristic; a shape characteristic and an object characteristic.

11. The computer device according to claim 1, wherein at least one game element of the first type is displayed with information indicating a number of matching characteristics in the ordered set of matching characteristics.

12. The computer device according to claim 1, wherein at least one game element of the first type is displayed with information indicating a remaining number of matching characteristics in the ordered set of matching characteristics.

13. The computer device according to claim 1, wherein at least one game element of the first type is displayed with information indicating a number of matching characteristics in the ordered set of matching characteristics which have been used.

14. The computer device as claimed in claim 1, wherein the at least one processor is configured to determine a triggering of a game element of the second type, the second type of game element, when triggered, causing at least one respective game element of the first type to change to a next matching characteristic of the ordered set.

15. The computer device as claimed in claim 1, wherein the at least one processor is configured to provide a reward when said first game element has had each of said characteristics of said ordered set.

16. The computer device as claimed in claim 15, wherein said reward comprises a game element of the second type.

17. A computer implemented method comprising:
displaying, by a display, game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics;

detecting, via a user interface, user input when a user engages with a game element in a move;

determining by at least one processor that at least three game elements have at least one common matching characteristic to satisfy a match condition; and determining by the at least one processor for each game element of the first type satisfying the match condition if a current matching characteristic is a last matching characteristic of the respective ordered set and if so removing the respective game element of the first type from the game board and if not changing at least one matching characteristic of the respective game element of the first type to a next characteristic of the ordered set of matching characteristics.

18. The method as claimed in claim 17, comprising displaying by the display each game element of the first type with information associated with a current matching characteristic of the respective ordered set.

19. The method as claimed in claim 17, comprising displaying by the display each game element of the first type in a same position before and after the match condition is satisfied.

20. The method as claimed in claim 17, wherein when at least one of the game elements satisfying the match condition is of the second type, the method comprises removing each game element of the second type satisfying the match condition from the game board.

21. The method as claimed in claim 17, wherein the ordered set of matching characteristics associated with at least one of the first type of game elements has n matching characteristics, where n is an integer greater than 2, and the method comprises when the first type of game elements has been associated in turn with n of the matching characteristics, causing the respective game element of the first type to be removed from the game board as a result of a subsequent match.

22. The method as claimed in claim 17, comprising displaying the game elements of the first type in a visually distinct manner from the game elements of the second type.

23. The method as claimed in claim 17, comprising displaying at least one game element of the first type with information indicating a number of matching characteristics in the ordered set of matching characteristics.

24. The method as claimed in claim 17, comprising determining a triggering of a game element of the second type, the second type of game element, when triggered, causing at least one respective game element of the first type to change to a next characteristic of the ordered set.

25. A non-transitory computer readable storage medium carrying one or more computer executable instructions which when run on at least one processor cause:

displaying of game elements in a game board of a computer implemented game, the game elements comprising a first type of game elements and a second type of game elements, each of the first type of game elements being associated with a plurality of matching characteristics of an ordered set of matching characteristics, the ordered set comprising at least two different matching characteristics;

detecting user input when a user engages with a game element in a move;

determining that at least three game elements have at least one common matching characteristic to satisfy a match condition; and determining for each game element of the first type satisfying the match condition if a current matching characteristic is a last matching characteristic of the respective ordered set and if so removing the respective game element of the first type from the game board and if not changing at least one matching characteristic of the respective game element of the first type to a next characteristic of the set of matching characteristics.

* * * * *